United States Patent [19]
Wilkes

[11] Patent Number: 5,759,387
[45] Date of Patent: Jun. 2, 1998

[54] GREY WATER FILTER TANK RECOVERY SYSTEM AND FILTER BACKWASHING SYSTEM

[75] Inventor: Robert D. Wilkes, Williamsburg, Va.

[73] Assignee: Essef Corporation, Chardon, Ohio

[21] Appl. No.: 721,325

[22] Filed: Sep. 26, 1996

[51] Int. Cl.⁶ .................................................. B01D 24/46
[52] U.S. Cl. ........................ 210/139; 210/274; 210/275; 210/277
[58] Field of Search ........................ 210/108, 138, 210/139, 274, 275, 277, 411, 793, 794, 167, 278, 279, 290, 532.1, 795, 257.1, 258, 261, 262, 796; 4/665

[56] References Cited

U.S. PATENT DOCUMENTS

| | | | |
|---|---|---|---|
| 3,459,302 | 8/1969 | Ross | 210/796 |
| 3,587,861 | 6/1971 | Ross | 210/277 |
| 3,797,667 | 3/1974 | Rod | 210/304 |
| 3,817,378 | 6/1974 | Ross | 210/274 |
| 3,831,755 | 8/1974 | Goodman et al. | 210/108 |
| 3,840,117 | 10/1974 | Ross | 210/274 |
| 3,915,857 | 10/1975 | Olson | 210/104 |
| 3,948,774 | 4/1976 | Lindman | 210/192 |
| 4,070,714 | 1/1978 | Bishton, Jr. et al. | 4/318 |
| 4,100,070 | 7/1978 | White et al. | 210/279 |
| 4,134,833 | 1/1979 | McCormick | 210/121 |
| 4,162,976 | 7/1979 | Monson | 210/170 |
| 4,240,911 | 12/1980 | Demeter et al. | 210/794 |
| 4,332,040 | 6/1982 | Palmer | 4/300 |
| 4,359,789 | 11/1982 | Roberts | 4/300 |
| 4,437,417 | 3/1984 | Roberts | 110/346 |
| 4,454,613 | 6/1984 | Palmer | 4/300 |
| 4,462,928 | 7/1984 | Dille et al. | 252/373 |
| 4,465,594 | 8/1984 | Laak | 210/151 |
| 4,466,810 | 8/1984 | Dille et al. | 48/197 R |
| 4,486,307 | 12/1984 | Weiler | 210/275 |
| 4,500,324 | 2/1985 | Vuong | 48/197 R |
| 4,515,691 | 5/1985 | Ida | 210/274 |
| 4,588,325 | 5/1986 | Seefert | 405/46 |
| 4,693,831 | 9/1987 | Garzonetti | 210/795 |
| 4,697,609 | 10/1987 | Salewski | 137/1 |
| 4,818,384 | 4/1989 | Mayer | 210/86 |
| 4,822,485 | 4/1989 | Mayer | 210/123 |
| 4,868,932 | 9/1989 | Thoma et al. | 4/323 |
| 5,039,407 | 8/1991 | Mohrman | 210/195.1 |
| 5,099,874 | 3/1992 | Della Cave | 137/357 |
| 5,106,493 | 4/1992 | McIntosh | 210/167 |
| 5,114,586 | 5/1992 | Humphrey | 210/606 |
| 5,147,532 | 9/1992 | Leek, Jr. | 210/97 |
| 5,160,606 | 11/1992 | De Simone et al. | 210/110 |
| 5,192,426 | 3/1993 | DeCoster et al. | 210/117 |
| 5,201,082 | 4/1993 | Rockwell | 4/665 |
| 5,206,962 | 5/1993 | Thorwaldson | 4/323 |
| 5,207,905 | 5/1993 | O'Brien et al. | 210/274 |
| 5,217,042 | 6/1993 | Delle Cave | 137/357 |
| 5,403,498 | 4/1995 | Morrissey et al. | 210/767 |
| 5,406,657 | 4/1995 | Donati | 4/665 |
| 5,409,616 | 4/1995 | Garbutt et al. | 210/760 |
| 5,415,673 | 5/1995 | Hilton et al. | 48/197 R |
| 5,452,956 | 9/1995 | Gilliam | 366/348 |

*Primary Examiner*—Joseph W. Drodge
*Attorney, Agent, or Firm*—Pearne, Gordon, McCoy and Granger LLP

[57] ABSTRACT

A grey water recovery system comprises a filter tank having a filter medium therein. Grey water is delivered to the filter tank by a delivery conduit and filtered grey water is collected in a sump which surrounds the filter tank. A pump removes the filtrate to a distribution system for irrigation and similar use. The recovery system includes a backwash system. The backwash system has a flow responsive poppet valve which permits clean backwashing water and pressurized air to flow upwardly through the filter medium while closing the normal filtrate flow path to the sump.

9 Claims, 3 Drawing Sheets

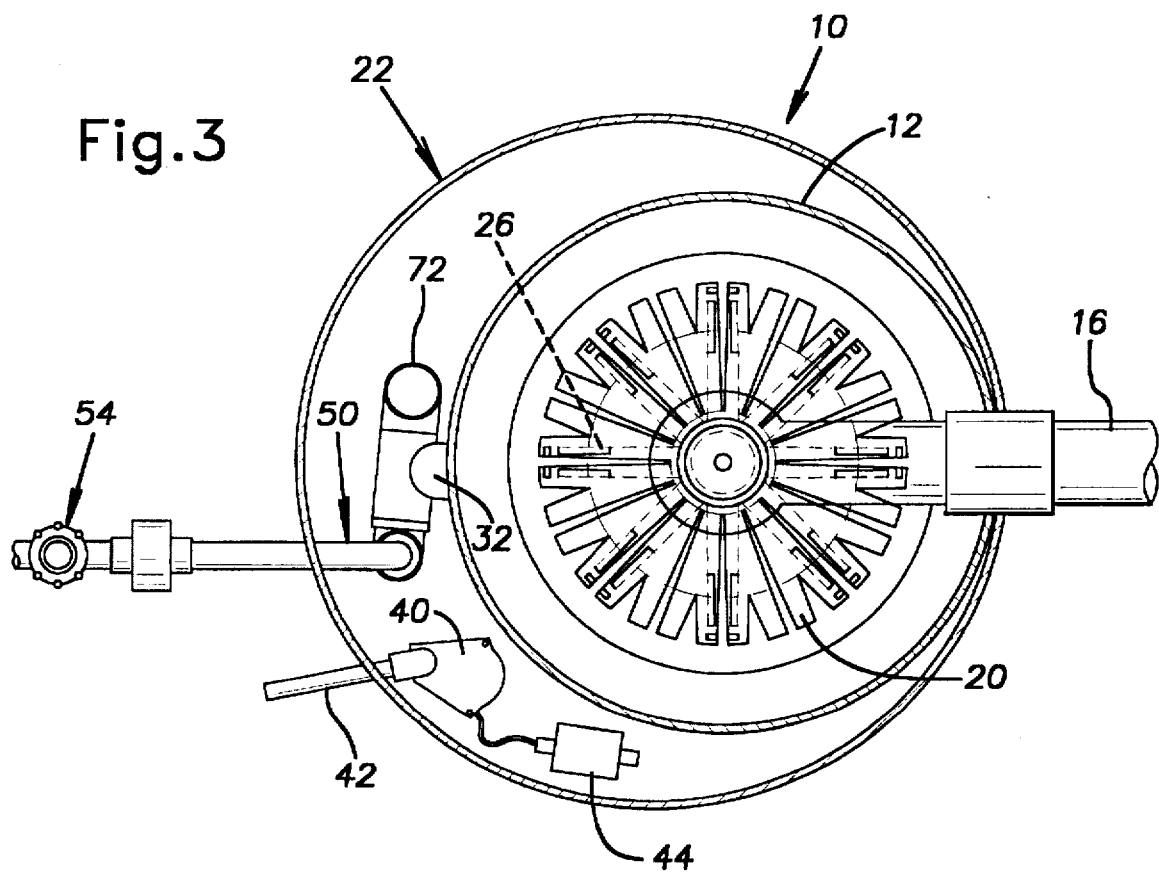

GREY WATER FILTER TANK RECOVERY SYSTEM AND FILTER BACKWASHING SYSTEM

BACKGROUND OF THE INVENTION

1. Field of the Invention

This invention relates to water recovery systems and, more particularly, to systems for recovering grey water from domestic sources and for recycling the water for use in conjunction with garden irrigation or other home use applications.

2. Description of the Related Art

In typical households, large quantities of water are consumed in clothes washing, laundry, personal hygiene and showers. Lesser amounts of water are employed for sewage disposal and food preparation. With the scarcity of water in various parts of the United States, it has become increasingly common to employ separate piping systems for the disposal of sewage on the one hand, and the recycling of grey water on the other hand. Such recycling systems, however, have certain drawbacks which have influenced their marketability.

A typical recycling grey water system includes a filter for separating the solids, hair and fibrous material normally associated with clothes washing and the cleaning of the human body. In existing systems, it is necessary to remove these materials from the filter on a frequent basis. Thus, it is desirable to provide an automatic system for cleaning the filters. While a market is developing for filter systems to generate useful grey water, the lack of an affordable automatic system limits sales potential substantially. This is because the mess and frequency of cleaning manual filters is constant and most potential customers choose not to perform these tasks on a regular basis. If manual systems are not provided with an automatic by-pass to a drain, a clogged manual filter will inhibit the flow of waste water from its source causing possible damage.

The critical sub-system to a backwashable filter, for example, a sand filter, is the backwashing function. Normally, in order to backwash a sand filter, a large flow of clean water is required to physically lift the sand bed and separate the dirt from the sand grains. If one were to apply this technique to a typical grey water sand filter, one would need a source for over 100 gallons of water and a large pump to deliver the necessary flow rates. Obviously, in those situations where the use of grey water is desirable the economics of such a grey water system is greatly diminished by the use of large amounts of clear water for backwashing.

BRIEF DESCRIPTION OF THE INVENTION

This invention greatly reduces the amount of clear water employed to backwash a grey water sand filter by injecting or blowing air into the backwash flow to readily lift and flush the sand. A typical backwash, according to this invention, is accomplished in three minutes and consumes between 30 and 40 gallons of water, as compared to at least a 100 gallons of water using prior art techniques. According to this invention, a valve is provided to shut off the normal path of grey water flow through the sand bed and to admit pressurized clear water up through the sand bed to a drain. An upper piston head in the clear water inlet line has a combination of radial clearance and holes which allows clear water to pass, but the restrictive flow path generates enough axial force on the piston head to compress a spring loaded poppet valve to its closed position to shut off the normal path of grey water to the sump. The clear water is thus directed into a tee where the air from a blower or injector joins the clear water and proceeds into a filter lateral system and upwardly into the sand bed. The air blower is protected from the clear water by a spring loaded check valve. This arrangement is only necessary if the blower fails to be powered when the backwashing operation takes place.

Other features of the invention include the use of a timer to control both the backwash interval and the backwash duration. According to this invention, the system is fail safe in that any malfunction results in a connection between the grey water effluent and the sewer system.

More specifically, according to this invention, a grey water recovery system comprises a filter tank having a filter medium, such as sand, therein. A grey water inlet conduit communicates with the tank and is adapted to deliver grey water to the medium for gravity feed therethrough. A sump container, having a portion positioned below the filter tank, is adapted to receive gravity-fed filtrate from the tank. An overflow and backwash conduit is in fluid communication with the tank and the grey water inlet conduit. The overflow and backwash conduit is adapted to receive backwashed effluent from the filter medium and is adapted to receive grey water from the grey water inlet conduit if flow through the filter medium is impeded. A pump is provided, having an inlet in the sump, for removing filtrate from the sump. A backwash circuit is provided in the recovery system. The backwash circuit comprises a fresh water conduit in fluid communication with the filtrate conduit for delivering pressurized fresh water to the tank at the bottom of the medium for upward backwash flow therethrough. A valving system is provided in the freshwater conduit which is adapted to block the flow of fluid to the sump through the filtrate conduit and to admit pressurized fresh water upwardly through the medium and to the overflow and backwash conduit. An air conduit is provided in communication with the filtrate conduit and a blower is provided at one end of the air conduit adapted to deliver pressurized air to the filtrate conduit upon operation of the valving system to admit pressurized fresh water and air upwardly through the medium.

BRIEF DESCRIPTION OF THE DRAWINGS

FIG. 3 is a cross-sectional view, the plane of the view being illustrated by the line 3—3 in FIG. 1.

DETAILED DESCRIPTION OF THE INVENTION

Figure 1:
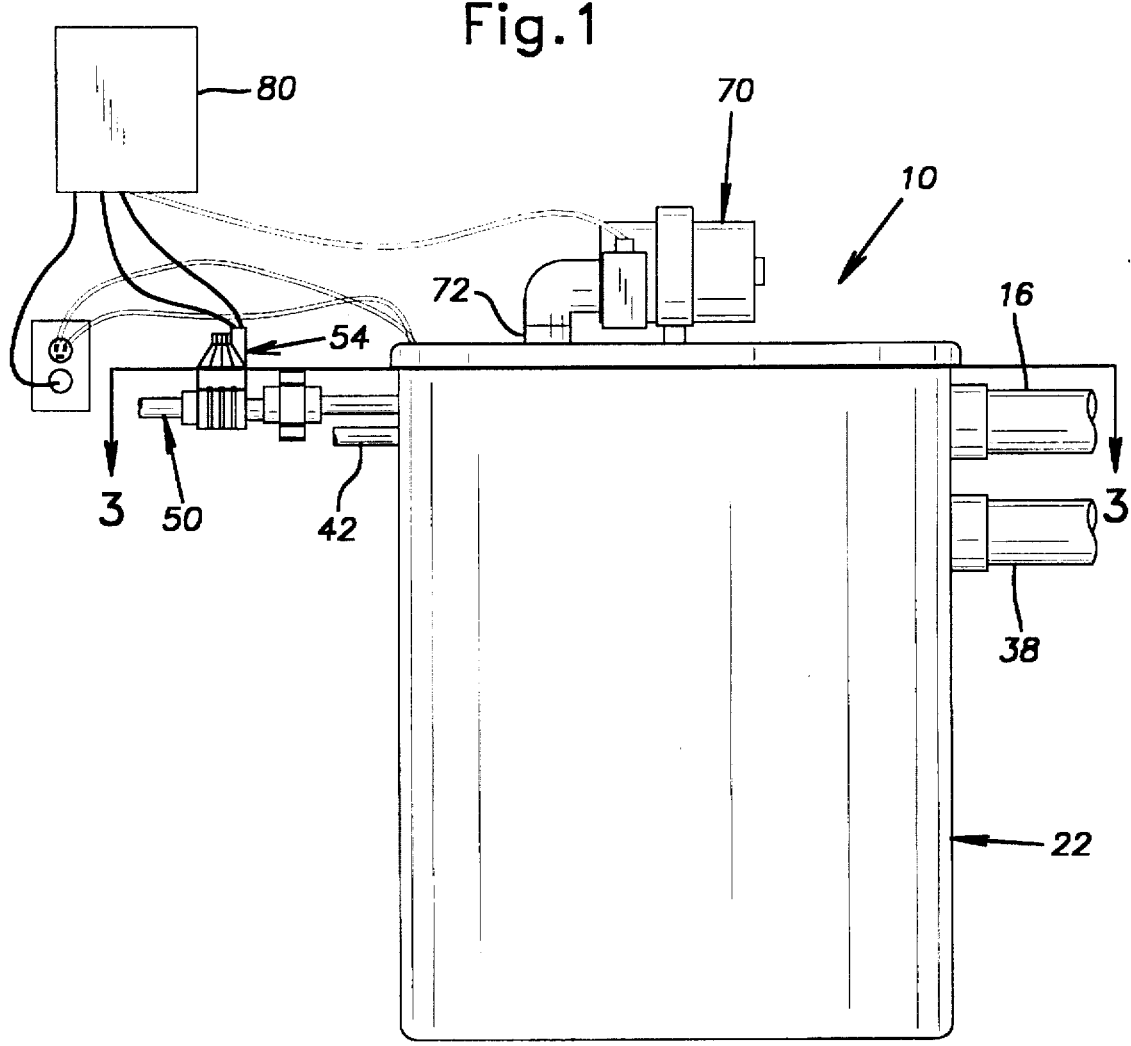
FIG. 1 is an elevational view of a grey water recovery system, according to this invention.
Figure 2:
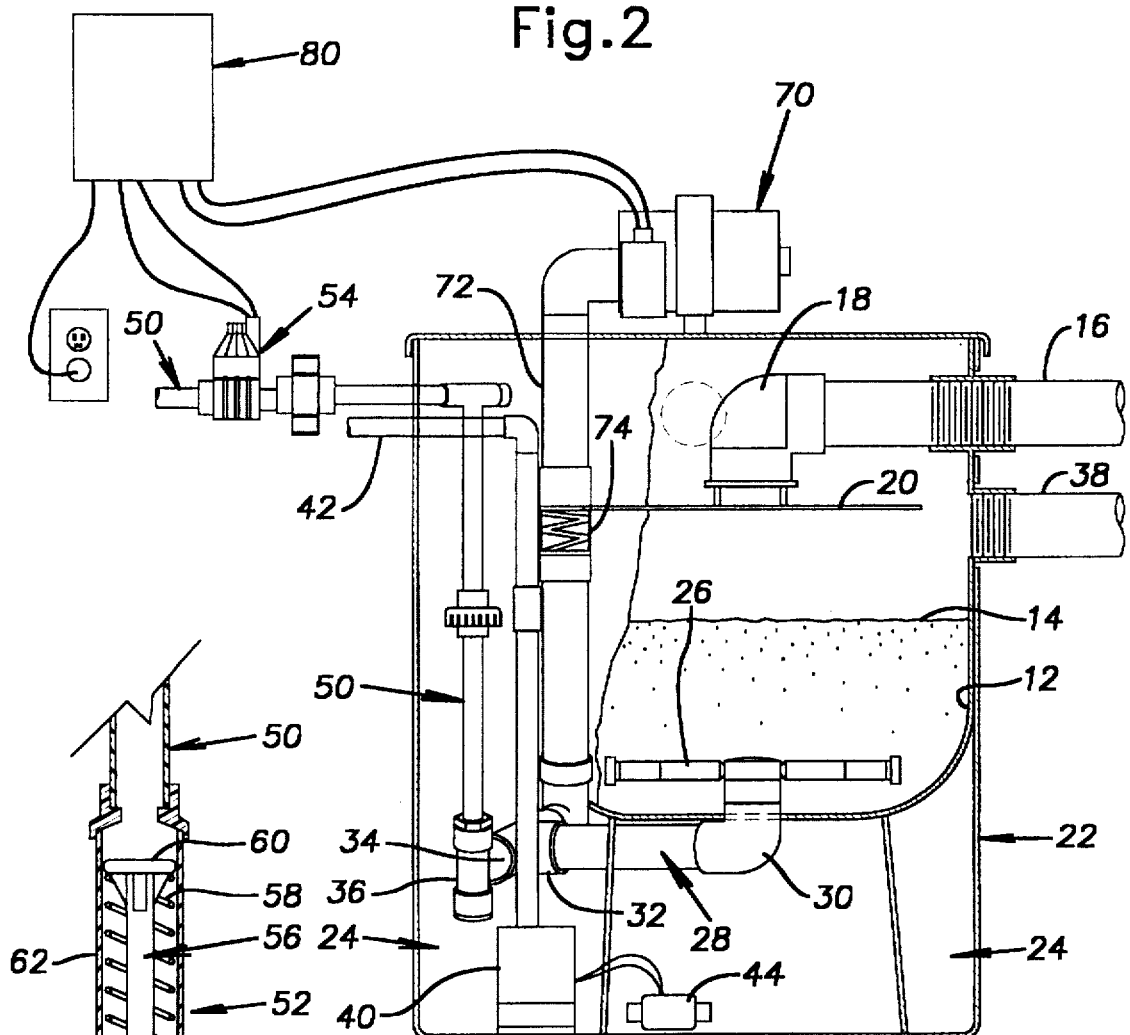
FIG. 2 is a fragmentary cross-sectional elevational view of the system shown in FIG. 1.

With reference to FIGS. 1–3, a grey water recovery system 10 is illustrated which is intended to receive grey water from various household units and to filter the grey water for further use such as garden irrigation or lawn sprinkling. The system 10 includes a filter tank 12 having a filter medium 14 therein. A conventional backwashable filter medium is typically sand. A grey water inlet 16 communicates with the tank 12 and is downwardly directed toward the medium 14 by an elbow fitting 18. The fitting 18 carries a deflector plate 20 in spaced relationship thereto and the deflector plate more uniformly disperses the incoming grey water on the medium.

With reference to FIGS. 2–3, a sump container 22 has a sump containment portion 24 positioned below the tank 12 and the portion 24 is adapted to receive gravity fed filtrate from the tank 12. The filtrate passes through the medium 14, distributor tubes 26, and through a filtrate conduit 28, which includes an elbow fitting 30 connected to the distributor tubes 26, and then through a T-fitting 32, a connecting tube 34, and a vertical casing 36.

An overflow and backwash conduit 38 extends through the walls of the sump container 22 and the filter tank 12 at a location of vertical tangency between the container 22 and the tank 12. The overflow and backwash conduit 38 is in fluid communication with the tank 12 and is located below the level of the grey water inlet conduit to prevent any siphoning of fluids from the conduit 38 to the conduit 16. The conduit 38 is adapted to receive backwashed effluent from the filter medium and is adapted to receive grey water from the inlet conduit 16 if flow through the filter medium 28 is impeded.

A pump 40 is positioned in the sump container to remove filtrate from the sump and to pump the filtrate through a filtrate outlet conduit 42. A float switch 44 is adapted to energize the pump 40 when the level of filtrate in the sump containment portion 24 reaches a predetermined level.

Figure 4:
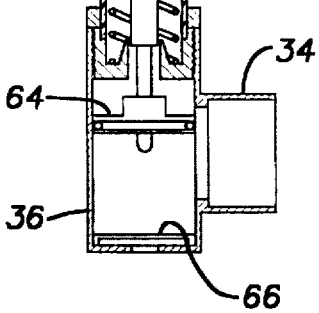
FIG. 4 is an enlarged cross-sectional view of a valving system according to the present invention.

A backwash circuit is provided in the recovery system to flush trapped particulate material from the filter medium to the overflow and backwash conduit 38. As may be seen in FIG. 2 and 4, the backwash circuit comprises a freshwater delivery conduit 50 in fluid communication with the filtrate conduit 28 for delivering pressurized fresh water to the filter tank 12 at the bottom of the medium 14 for upward backwash flow through the medium. The backwash circuit includes a valving system 52 (FIG. 4) in the fresh water conduit 50 which is adapted to block the flow of fluid to the sump containment portion 24 from the filtrate conduit 28 and to admit pressurized fresh water upwardly through the medium 14 through the overflow and backwash conduit 38.

During normal operations, the fresh water conduit 50 is closed by a solenoid operated valve 54. When it is desired to backwash the medium 14, the valve 54 is opened to admit pressurized water to the conduit 50. As may be seen in FIG. 4, pressurized water operates the valving system 52 by driving a piston assembly 56 downwardly against the bias of a spring 58. A piston head 60 is loosely fitted into a cylindrical extension 62 of the conduit 50 to provide a controlled leakage around the piston head 60 and to apply force to a lower piston head 64. Additionally, apertures (not shown) may be provided in the piston head 60 to provide sufficient flow. The flow pressure is sufficient to compress the spring 58 and cause the lower piston 64 to bottom on a valve seat 66, thus, closing any flow of fresh or grey water to the sump 24. Fresh water flow is therefore through the conduit 28 and the distributor tubes 26 and upwardly through the filter medium 14.

To reduce the consumption of clear water for backwashing purposes, a blower 70 is provided to force air through an air delivery conduit 72 to the T-fitting 32. Air, therefore, is mixed with the clear backwash water to greatly agitate and lift the sand bed to remove impurities. A spring biased check valve 74 is provided in the conduit 72 to prevent water from entering the blower 70, if the blower 70 is not operating.

When the collected water in the sump totals 20 to 30 gallons, as sensed by the float switch 44, the pump 40 is energized to empty the sump and deliver the filtrate to the distribution conduit 42. After a period of time, the filter media 14 will become dirty and require backwashing. A programmable timer 80 is provided to automatically operate the solenoid valve 54 for a predetermined amount of time to backwash the media 14. The timer 80 may be programmed to operate the backwash at a non-peak usage time, such as an early morning hour, since it is desirable to operate the backwashing function when grey water is not being received in the unit.

The present disclosure describes several embodiments of the invention, however, the invention is not limited to these embodiments. Other variations are contemplated to be within the spirit and scope of the invention and appended claims.

What is claimed is:

1. A grey water recovery system comprising a filter tank, a filter medium in said tank, a grey water inlet conduit communicating with said tank adapted to deliver grey water to said filter medium for gravity feed therethrough, a sump container having a portion positioned below said tank and being adapted to receive a flow of gravity fed filtrate from said tank, a filtrate conduit from said tank to said sump portion, an overflow and backwash conduit in fluid communication with said tank, said overflow and backwash conduit being adapted to receive backwashed effluent from said filter medium and adapted to receive grey water from said grey water inlet conduit if flow through said filter medium is impeded, a pump having an inlet in said sump portion for removing filtrate from said sump portion, a backwash circuit in said recovery system, said circuit comprising a fresh water conduit in fluid communication with said filtrate conduit for delivering pressurized fresh water to the tank at the bottom of the filter medium for upward backwash flow through said filter medium, a valving system in said fresh water conduit which can be operated to block the flow of filtrate to said sump container through said filtrate conduit and to admit pressurized fresh water upwardly through said filtrate conduit and said filter medium and to said overflow and backwash conduit, and means for introducing pressurized air into said filtrate conduit when pressurized fresh water is flowing through said filtrate conduit.

2. A grey water recovery system according to claim 1, wherein said means for introducing pressurized air includes an air conduit in communication with said filtrate conduit and a blower at one end of said air conduit adapted to deliver pressurized air to said filtrate conduit upon operation of said valving system to admit pressurized fresh water through said filter medium.

3. A grey water recovery system according to claim 1 wherein said filter tank is positioned within said sump tank.

4. A grey water recovery system according to claim 1 wherein said valving system includes a flow control valve in said fresh water conduit, a spring biased poppet valve having an upper piston head in said fresh water conduit downstream of said flow control valve, said upper piston head being spaced from the sidewall of said fresh water conduit to provide clearance for fresh water flow past said upper piston head, said poppet valve having a lower piston head adapted to move in a direction to close said fresh water conduit and said filtrate conduit from fluid communication with said sump portion, and said upper piston head being moved in a direction of fluid flow past said upper piston head against the bias of said spring to thereby move said lower piston head to a closed position.

5. A grey water recovery system, according to claim 4, including a timer adapted to operate and control initiation and duration of the operation of said flow control valve.

6. A grey water recovery system comprising a filter tank, a filter medium in said tank, a grey water inlet conduit communicating with said tank adapted to deliver grey water to said filter medium for gravity feed therethrough, a sump container having a portion positioned below said tank and being adapted to receive a flow of gravity fed filtrate from said tank, a filtrate conduit from said tank to said sump portion, an overflow and backwash conduit in fluid communication with said tank, said overflow and backwash conduit being adapted to receive backwashed effluent from said filter medium and adapted to receive grey water from said grey water inlet conduit if flow through said filter medium is impeded, a pump having an inlet in said sump portion for removing filtrate from said sump portion, a backwash circuit in said recovery system, said circuit comprising a fresh water conduit in fluid communication with said filtrate conduit for delivering pressurized fresh water to the tank at the bottom of the filter medium for upward backwash flow through said filter medium, a valving system in said fresh water conduit which can be operated to block the flow of filtrate to said sump container through said filtrate conduit and to admit pressurized fresh water upwardly through said filtrate conduit and said filter medium and to said overflow and backwash conduit, wherein said valving system includes a flow control valve in said fresh water conduit, a spring biased poppet valve having an upper piston head in said fresh water conduit downstream of said flow control valve, said upper piston head being spaced from the sidewall of said fresh water conduit to provide clearance for fresh water flow past said upper piston head, said poppet valve having a lower piston head adapted to move in a direction to close said fresh water conduit and said filtrate conduit from fluid communication with said sump portion, and said upper piston head being moved in a direction of fluid flow past said upper piston head against the bias of said spring to thereby move said lower piston head to a closed position.

7. A grey water recovery system, according to claim 6, including a timer adapted to operate and control initiation and duration of the operation of said flow control valve.

8. A grey water recovery system according to claim 7 including an air conduit in communication with said filtrate conduit and a blower at one end of said air conduit adapted to deliver pressurized air to said filtrate conduit upon operation of said valving system to admit pressurized fresh water through said filter medium.

9. A grey water recovery system according to claim 6 including an air conduit in communication with said filtrate conduit and a blower at one end of said air conduit adapted to deliver pressurized air to said filtrate conduit upon operation of said valving system to admit pressurized fresh water through said filter medium.

* * * * *